United States Patent
Patel et al.

(10) Patent No.: US 11,230,497 B2
(45) Date of Patent: Jan. 25, 2022

(54) CEMENT ADDITIVES

(71) Applicant: Saudi Arabian Oil Company, Dhahran (SA)

(72) Inventors: Hasmukh A. Patel, Houston, TX (US); Peter Boul, Houston, TX (US); Carl Thaemlitz, Cypress, TX (US)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 16/843,070

(22) Filed: Apr. 8, 2020

(65) Prior Publication Data
US 2020/0325070 A1 Oct. 15, 2020

Related U.S. Application Data (60) Provisional application No. 62/832,030, filed on Apr. 10, 2019.

(51) Int. Cl.
*C04B 24/16* (2006.01)
*C04B 28/04* (2006.01)
*C09K 8/467* (2006.01)
*C08G 83/00* (2006.01)

(52) U.S. Cl.
CPC ............ *C04B 24/168* (2013.01); *C04B 28/04* (2013.01); *C09K 8/467* (2013.01); *C08G 83/007* (2013.01)

(58) Field of Classification Search
CPC ..... C04B 24/168; C04B 28/04; C08G 83/007; C09K 8/42; C09K 8/422; C09K 8/426; C09K 8/428; C09K 8/44; C09K 8/46; C09K 8/467
See application file for complete search history.

(56) References Cited

U.S. PATENT DOCUMENTS

| | | | |
|---|---|---|---|
| 3,301,797 A | 1/1967 | Drucket et al. | |
| 3,481,903 A | 12/1969 | Alelio | |
| 4,272,430 A | 6/1981 | Pieh et al. | |
| 4,615,809 A * | 10/1986 | King | C04B 28/10 |
| | | | 588/315 |
| 4,771,112 A | 9/1988 | Engelbrecht | |
| 5,352,290 A | 10/1994 | Takeshita et al. | |
| 5,401,312 A * | 3/1995 | Hanst | C04B 28/18 |
| | | | 106/706 |
| 5,645,637 A | 7/1997 | Yaniv | |
| 6,664,215 B1 | 12/2003 | Tomlinson | |
| 6,668,927 B1 * | 12/2003 | Chatterji | C09K 8/40 |
| | | | 166/291 |
| 6,828,378 B2 | 12/2004 | Okumura et al. | |

(Continued)

FOREIGN PATENT DOCUMENTS

| CN | 104204035 A * | 12/2014 | ......... C08B 37/0015 |
|---|---|---|---|
| CN | 107522436 | 12/2017 | |

(Continued)

OTHER PUBLICATIONS

Translation of CN 107522436 A, obtained from EPO website (Year: 2017).*

(Continued)

*Primary Examiner* — Angela M DiTrani Leff
(74) *Attorney, Agent, or Firm* — Fish & Richardson P.C.

(57) ABSTRACT

A cement composition and set cement including cement and a sliding-ring polymer. A system and method of applying the cement composition.

27 Claims, 8 Drawing Sheets

(56) References Cited

U.S. PATENT DOCUMENTS

| | | | |
|---|---|---|---|
| 7,497,258 | B2 | 3/2009 | Savery et al. |
| 7,527,098 | B2 | 5/2009 | Santra et al. |
| 7,612,142 | B2 | 11/2009 | Ito et al. |
| 7,622,527 | B2 | 11/2009 | Ito et al. |
| 7,637,319 | B2 | 12/2009 | Savery et al. |
| 7,654,326 | B1 | 2/2010 | Santra et al. |
| 7,799,867 | B2 | 9/2010 | Ito et al. |
| 7,833,344 | B2 | 11/2010 | Santa et al. |
| 7,847,049 | B2 | 12/2010 | Ito et al. |
| 7,893,011 | B2 | 2/2011 | Lewis et al. |
| 7,893,168 | B2 | 2/2011 | Ito et al. |
| 7,943,718 | B2 | 5/2011 | Ito et al. |
| 7,981,943 | B2 | 7/2011 | Ito et al. |
| 8,007,911 | B2 | 8/2011 | Ito et al. |
| 8,017,688 | B2 | 9/2011 | Ito et al. |
| 8,142,562 | B2 | 3/2012 | Klettke et al. |
| 8,382,476 | B2 | 2/2013 | Schulte et al. |
| 8,418,763 | B1 | 4/2013 | Deen et al. |
| 8,450,415 | B2 | 5/2013 | Ito et al. |
| 8,580,906 | B2 | 11/2013 | Hayashi et al. |
| 8,673,364 | B2 | 3/2014 | Jalota et al. |
| 9,023,150 | B2 | 5/2015 | Brenneis et al. |
| 9,068,051 | B2 | 6/2015 | Yamasaki et al. |
| 9,266,972 | B2 | 2/2016 | Yamasaki et al. |
| 9,375,699 | B2 | 6/2016 | Ladet |
| 9,428,682 | B2 | 8/2016 | Muthusamy et al. |
| 9,617,460 | B2 | 4/2017 | Reddy |
| 9,708,869 | B2 | 7/2017 | Sarmah et al. |
| 10,060,242 | B2 | 8/2018 | Benoit et al. |
| 10,150,905 | B1 | 12/2018 | Reddy |
| 2003/0138398 | A1* | 7/2003 | Okumura ............ B60C 1/00 424/78.38 |
| 2006/0048671 | A1 | 3/2006 | Ong |
| 2008/0156225 | A1* | 7/2008 | Bury ............ C04B 40/0039 106/14.05 |
| 2008/0287633 | A1 | 11/2008 | Drumheller |
| 2009/0030108 | A1* | 1/2009 | Ito .................. C08L 71/02 523/106 |
| 2009/0214871 | A1 | 8/2009 | Fukuda et al. |
| 2010/0006288 | A1 | 1/2010 | Santa et al. |
| 2012/0322695 | A1 | 12/2012 | Kefi et al. |
| 2014/0342531 | A1 | 11/2014 | Tominaga et al. |
| 2015/0033719 | A1 | 2/2015 | Lawrence et al. |
| 2015/0198008 | A1 | 7/2015 | Smith et al. |
| 2016/0102238 | A1 | 4/2016 | Mulhusamy et al. |
| 2017/0218248 | A1 | 8/2017 | Boul et al. |
| 2017/0369761 | A1 | 12/2017 | Jones et al. |
| 2018/0045870 | A1 | 2/2018 | Asahi et al. |
| 2018/0215988 | A1 | 8/2018 | Gamwell et al. |
| 2019/0310396 | A1 | 10/2019 | Matsumoto et al. |

FOREIGN PATENT DOCUMENTS

| | | | |
|---|---|---|---|
| CN | 112456870 | A * | 3/2021 |
| JP | 2016088878 | A * | 5/2016 |
| JP | 6647751 | B2 * | 2/2020 |

OTHER PUBLICATIONS

Translation of JP 6647751 B2, obtained from EPO website (Year: 2020).*

Translation of CN 104204035 A, obtained from EPO website (Year: 2014).*

Translation of JP-2016088878-A.*

Translation of CN-112456870-A.*

Translation of JP-6647751-B2.*

International Search Report and Written Opinion in International Application No. PCT/US2020/027436 dated Jul. 16, 2020, 14 pages.

API, "10B-2, Recommended Practice for Testing Well Cements," American Petroleum Institute, 1-124, RP 10B-2, 2019.

asmi.jp [online], "SeRM Series Products List," asmi.jp, Advanced Softmaterials Inc., retrieved from URL <www.asmi.jp/en/product#sec_03>, retrieved on Aug. 15, 2019, available on or before Jan. 2013 (via wayback machine URL <https://web.archive.org/web/20130315000000*/www.asmi.jp/en/product>), 5 pages.

Choi et al., "Highly elastic binders integrating polyrotaxanes for silicon microparticle anodes in lithium ion batteries," Science, 357, 279, Jul. 2017, 5 pages.

Liu et al., "A novel method to evaluate cement shale bond strength," SPE International Symposium on Oilfield Chemistry, SPE-173802-MS, Apr. 13-15, 2015, 20 pages.

Opedal et al., "Experimental study on the cement-formation bonding," SPE International Symposium and Exhibition on Formation Damage Control, Feb. 26-28, 2014, 12 pages.

Radonjic and Oyibo, "Experimental evaluation of wellbore cement-formation shear bond strength in presence of drilling fluid contamination," International Conference on porous media and their applications in science, engineering and industry, Hawaii, Jun. 24, 2014, 7 pages.

Zoback, "Reservoir geomechanics," Cambridge University Press, 2010.

* cited by examiner

CEMENT ADDITIVES

CROSS-REFERENCE TO RELATED APPLICATION

This application claims the benefit of priority to U.S. Provisional Application Ser. No. 62/832,030, filed on Apr. 10, 2019, the contents of which are hereby incorporated by reference.

TECHNICAL FIELD

This disclosure relates to cement additives including for cementing applications associated with a wellbore.

BACKGROUND

Oil well cementing may include mixing a slurry of cement and water, and pumping the slurry down the wellbore casing, tubing, or drill pipe to a specified elevation or volume in the well. Primary cementing may involve casing cementation. Primary cementing may be the cementing that takes place soon after the lowering of the casing into the hydrocarbon formation and may involve filling the annulus between the casing and the hydrocarbon formation with cement. Secondary cementing includes various cementing operations in which cement is pumped into a well during drilling or production phases. Secondary cementing can involve remedial cementing such as squeeze cementing.

SUMMARY

An aspect relates to cement compositions having cement and a sliding-ring polymer.

Another aspect relates to a wellbore having a casing in a geological formation. The wellbore includes set cement in an annulus between the casing and the geological formation. The set cement has a sliding-ring polymer.

Yet another aspect relates to a method of cementing a wellbore in a geological formation, including applying a cement composition having a sliding-ring polymer into the wellbore and allowing the applied cement composition to cure to give set cement having the sliding-ring polymer.

The details of one or more implementations are set forth in the accompanying drawings and the description later. Other features and advantages will be apparent from the description and drawings, and from the claims.

BRIEF DESCRIPTION OF DRAWINGS

Like reference numbers and designations in the various drawings indicate like elements.

DETAILED DESCRIPTION

Aspects of the present techniques are directed to sliding-ring polymer systems as cement additives. This disclosure relates to cement additives including sliding-ring polymers that incorporate polyrotaxanes. The "sliding-ring polymers" of the present disclosure may be defined as sliding-ring polymers incorporating polyrotaxanes. Present embodiments employ sliding-ring polymers as additives in cement to improve mechanical properties of the set cement. The sliding-ring polymers provide for movable cross-links or mechanical bonds that allow polymer chains to slide in the sliding-ring polymers. This is in contrast to conventional polymer additives that have links or covalent bonds where motion of the polymer chains are restricted. The sliding characteristics of sliding-ring polymers facilitate dispersion of stresses throughout the set-cement matrix. In contrast, the links in conventional polymers break over repeated cycles of stresses. The sliding-ring polymers described in the present techniques may restrict the formation of microcracks, restrict propagation of fractures, and improve (increase) the stiffness of the set cement. As discussed later, present embodiments provide for functionalized polymers and organic-inorganic hybrids as capping agents for the polyrotaxanes of the sliding-ring polymers.

In application, the cement placed in the annulus between a wellbore casing and a geological formation generally experiences stresses under wellbore temperature and pressure. These stresses can deteriorate mechanical properties of set cement over a period of time that can affect production and increase the cost of operation of the oil or gas well. Embodiments of the present techniques improve set-cement mechanical properties including stiffness under downhole conditions. The sliding-ring polymers developed in the present techniques as cement additives may reduce the presence of fractures in the set cement, restrict propagation of microcracks in the set cement, and generally aid in holding together the set cement.

Polyrotaxanes and sliding-ring polymers may be produced through host-guest chemical routes. In the synthesis, ring-type organic compounds are loaded onto a linear polymeric chain. The linear polymeric chain threaded through the ring-type organic compounds is then subjected to end-capping by chemical moieties to restrict the ring-type compounds from de-threading. These end-capped materials are called polyrotaxanes. The surfaces of the ring-type compounds in the polyrotaxanes may be chemically modified so that the ring-type compounds can be cross-linked with large molecular-weight polymeric materials (for example, having a weight-average molecular weight (molecular mass) greater than 10,000 grams per mole). The functionalize rings of the polyrotaxanes are cross-linked with the polymeric materials (polymers) to give sliding-ring polymers. The polyrotaxanes cross-linked to the polymers are sliding-ring polymers.

These sliding-ring polymers may be added into the cement formulation and the cement formulation cured, for example, in the range of 160° F. to 200° F. (for instance, at 180° F.) under a pressure in the range 10 megapascal (MPa) to 30 MPa (or at least 20 MPa) to give set cements. In Examples 2, 3, and 4 presented later, the preparing and testing of the set cement was per the American Petroleum Institute (API) Specification 10A (24th Edition, December 2010).

Traditional additives, such as polymeric additives or latex, for cement have been utilized to improve the mechanical properties of the set cements. These polymeric additives may typically be covalently-linked chemical structures. Although the covalent linkages and bonds in chemical structures are known for having a bond strength greater than ionic or hydrogen bonding, the covalent linkages or bonds generally lack ability to accommodate stress distributions throughout the cement matrix. Therefore, these types of polymeric additives generally provide little or no resistance to cement crack formation under the repeated cycles of stresses in the presence of downhole temperature and pressure. Furthermore, once the polymer chains of the additives are broken, fractures can propagate in the set cement and eventually the set cements may lose their mechanical properties such that the set cement is not sustained under downhole conditions. These cement failures can adversely affect hydrocarbon production rate and increase cost of operation.

Figure 2:
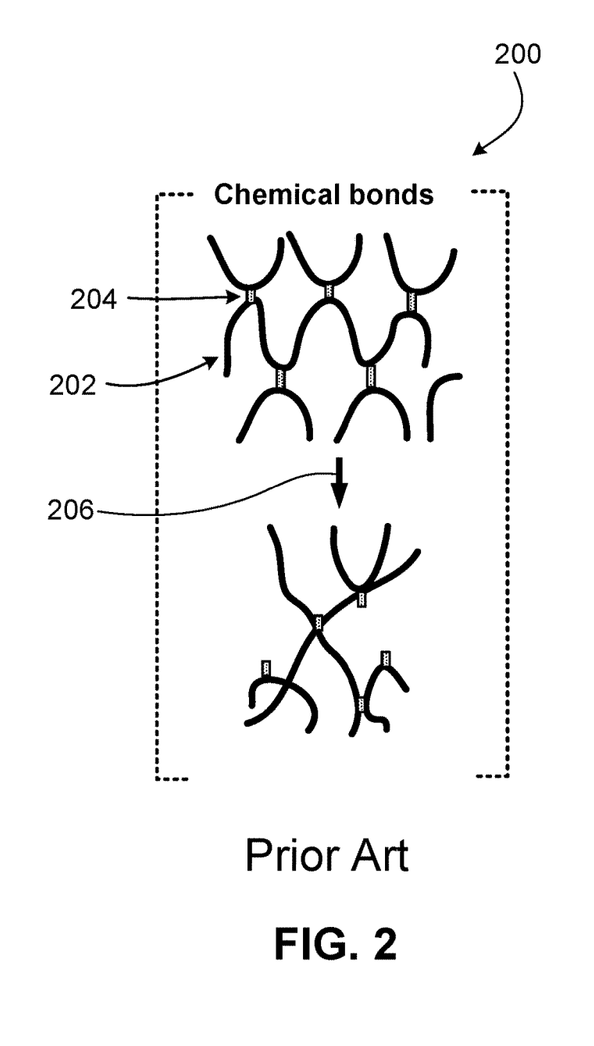
FIG. 2 is a diagram of linked polymer chains which are polymer chains linked via chemical bonds such as covalent linkages.
Figure 3:
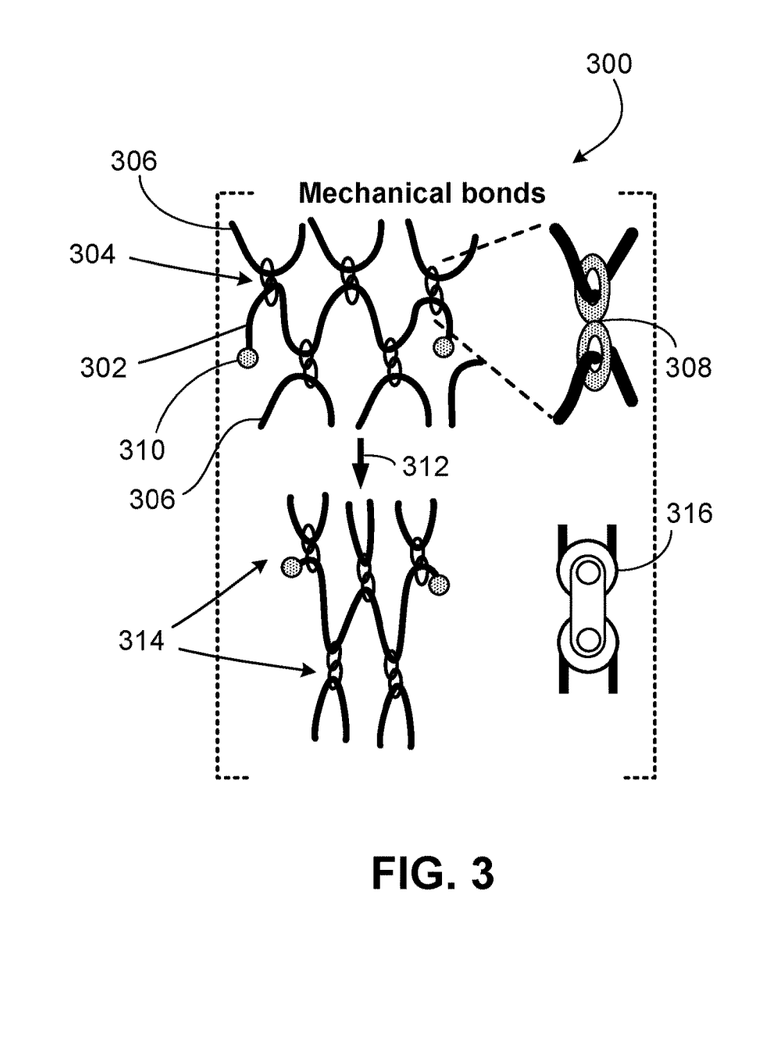
FIG. 3 is a diagram of a polymer system having mechanical bonds, and which may be cement additive.

In response to these shortcomings associated with the conventional polymeric additives, present embodiments focus on polymeric systems having polyrotaxanes or sliding-ring polymers as cement additives. These sliding-ring polymers as additives in the set cement promote that stresses encountered by the set cements under the downhole conditions are generally distributed throughout at least a portion of the set-cement matrix. In addition to stress distribution, these polyrotaxanes and sliding-ring polymers as cement additives may provide the ability to restrict the propagation of micro-cracks and thus resist the failure of the set-cement mechanical properties. A comparison of the mechanism of traditional covalently-linked polymeric additives and the additives as sliding-ring polymers developed in the present techniques to improve the stiffness of the set cement is represented in FIGS. 2 and 3 discussed later.

In present embodiments, sliding-ring polymers incorporating polyrotaxanes are employed as additives in cements for the construction of subterranean wells and for above-ground cement construction applications. Syntheses of the polyrotaxanes and the sliding-ring polymer from the polyrotaxanes are discussed in more detail later. Examples of cement formulations were prepared and are presented later. One cement formulation (Formulation C) prepared had a sliding-ring polymer as an additive. Analyses of the Example cements included examining mechanical properties of the set cements. Cement samples were prepared and rheological and mechanical tests performed. Confined-stress mechanical testing of the cement samples containing sliding-ring polymers and other additives was evaluated. The cement compositions may be for downhole cement compositions or field applications for cement having these new additives (sliding-ring polymers incorporating polyrotaxanes).

Figure 1:
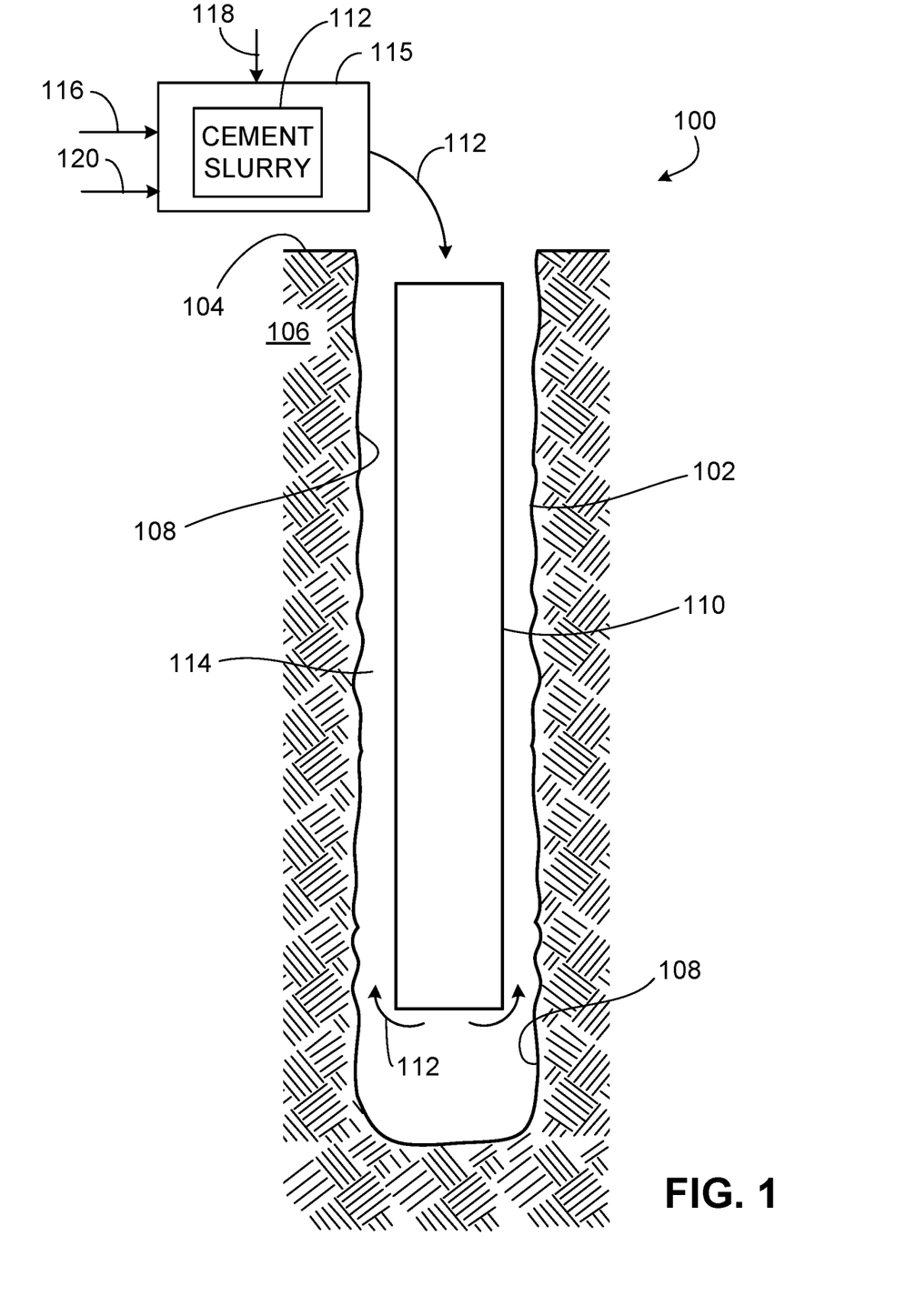
FIG. 1 is a diagram of a well site including a wellbore formed through the Earth surface into a geological formation in the Earth crust.

Turning now to the drawings, FIG. 1 is a well site 100 including a wellbore 102 formed through the Earth surface 104 into a geological formation 106 in the Earth crust. The wellbore 102 is defined by a borehole surface 108 of the formation 106. The wellbore 102 includes a casing 110. In some implementations to cement the casing 110 in place, a cement slurry 112 is pumped down through the casing 110. The cement slurry 112 exits the bottom portion of the casing 110 and then flows upward through the annulus 114 between the casing 110 and the formation 106. The cement slurry 112 is allowed to set in the annulus 114 to cement the casing 110. This cementing of the casing 110 may be labeled as primary cementing. The cement formulations employed in the present techniques may also be utilized in secondary or remedial cementing.

Surface equipment 115 may be associated with the wellbore 102 for drilling the wellbore 102 and installation of the casing 110, and for cementing the annulus 114 between the casing 110 and the formation surface 108. The surface equipment 115 may include a vessel or truck for holding cement slurry 112. The cement slurry 112 may be prepared at the well site 100 or off-site. The cement slurry 112 may be prepared by mixing cement 116, water 118, and cement additive(s) 120. In some implementations, the cement additives 120 may be incorporated into the cement 116 prior to the mixing with the water 118. The cement additives 120 may include polyrotaxanes or sliding-ring polymers synthesized from polyrotoxanes.

The surface equipment 115 may include a mounted drilling rig, which may be a machine that creates boreholes in the Earth subsurface. The term "rig" may refer to equipment employed to penetrate the Earth surface 104 of Earth crust. To form a hole in the ground, a drill string having a drill bit may be lowered into the hole being drilled. In operation, the drill bit may rotate to break the rock formations to form the hole as a borehole or wellbore 102. In the rotation, the drill bit may interface with the ground or formation 106 to grind, cut, scrape, shear, crush, or fracture rock to drill the hole. The open-hole wellbore having a wall 108 with the formation 106 is drilled and formed through the Earth surface 104 into the hydrocarbon or geological formation 106.

In operation, a drilling fluid (also known as drilling mud) is circulated down the drill string (not shown) to the bottom of the openhole wellbore 102. The drilling fluid may then flow upward toward the surface through an annulus formed between the drill string and the wall 108 of the wellbore 102 as openhole. The drilling fluid may cool the drill bit, apply hydrostatic pressure upon the formation penetrated by the wellbore, and carry formation cuttings to the surface. In addition to the drilling rig, surface equipment 115 may include tanks, separators, pits, pumps, and piping for circulating drilling fluid (mud) through the wellbore.

The casing 110 may be lowered into the wellbore 102 and cement slurry applied to the annulus between the casing 110 and the formation surface 108 of the wellbore 102. Oil-well cementing may include mixing a slurry of cement and water, and pumping the slurry down the casing 110, tubing, or drill pipe to a specified elevation or volume in the well. As indicated, primary cementing may involve casing cementation. Primary cementing may be the cementing that takes place soon after the lowering of the casing 110 into the formation 106 and may involve filling the annulus 114 between the casing 110 and the formation 106 with cement.

FIG. 2 are linked polymer chains 200 which are polymer chains 202 linked via chemical bonds such as covalent linkages 204. Conventional polymeric additives for cement may include polymer chains 202 covalently bonded. As stress is applied 206 to these linked polymer chains 200 in set cement, the stress may concentrate on short chains and thus the covalent linkages 204 may unfortunately break. The stresses are concentrated on the short chains that eventually break under repeated stress in downhole conditions.

FIG. 3 is a polymer system 300 having mechanical bonds. The polymer system 300 represents implementations of cement additives in accordance with embodiments of the present disclosure. The cement may incorporate sliding-ring polymeric additives. In the illustrated embodiment, the sliding-ring polymer includes polyrotaxanes 302 and polymer chains 306. The polyrotaxanes 302 mechanically bond via a ring-type moiety 304 to the polymer chains 306. The two rings in the ring-type moiety 304 may bond 308 to each other as either cross-linked or linked by hydrogen bonds. The bond of the polymer chains 306 with the rings of the ring-type moiety 304 may be a mechanical bond. The polyrotaxane 302 may have bulky end groups 310 to resist displacement threading release of the polyrotaxane 302 from the ring-type moiety 304.

FIG. 3 depicts stress distribution in sliding-ring polymeric additives. As stress 312 is applied to the additives in set cement, the threaded rings facilitate sliding 314 of the polyrotaxane 302 and polymer chains 306. The stress is dispersed in the polymer chains 306 such as analogous to a pulley 316 effect.

The molecular-level effects originate from the sliding motion through threaded rings (a pulley effect) leading to generally uniform dispersion of stresses in the cement matrix. The blending of sliding-ring polymeric additives in the cement imparts improvement in cement mechanical properties such as stiffness. The addition of these additives into cement may provide at least the following two properties: (i) distribution of stresses throughout the matrix of set cement; and (ii) if microcracks in the set cement arise, the sliding motions may restrict propagation of the microcracks and thus aid in holding together the set cement.

Figure 4:
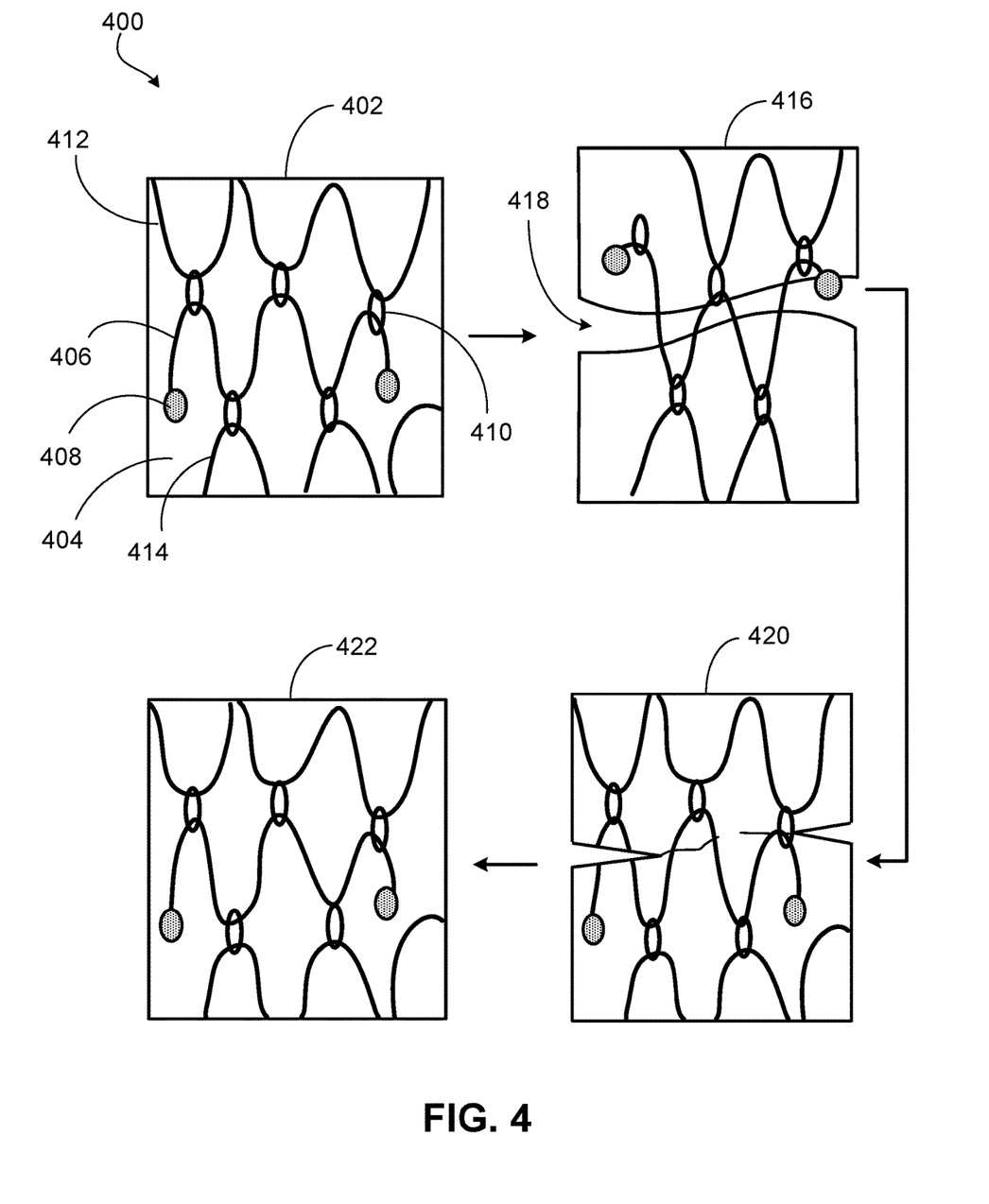
FIG. 4 is a sequence diagram depicting effect of stress on set cement having a sliding-ring polymer as a cement additive.

FIG. 4 is a sequence diagram 400 depicting effect of stress on set cement having a sliding-ring polymer as a cement additive. The diagram 400 gives a time sequence of the effect of the stress and the sliding-ring polymer.

Initially, the pristine condition 402 is the set cement 404 as originally set. The sliding-ring polymer includes a polyrotaxane 406 having bulky end groups 408. The polyrotaxane 406 is coupled via its rings 410 to the polymer chains 412, 414. In certain implementations, there is an ester (—COO—) bond between the polymer chains 412, 414 and the rings 410. The ester bond may be formed, for example, from carboxylic groups of the polymer chains 412, 414 and hydroxypropylated groups on the rings 410.

The polyrotaxane 406 is a linear polymer chain threaded through the rings 410. The rings 410 may be a ring-type organic compound such as cyclodextrin. The polymer chains 412, 414 are depicted as threaded through the rings 410. However, the polymer chains 412, 414 may instead be anchored to a surface (for example, an outer surface) of the rings 410. The anchoring may be cross-linking (for example, via a functional group) of the rings 410 to the polymer chains 412, 414. While a respective single ring 410 per moiety is depicted for clarity, the ring 410 may be a member ring of a ring-type moiety (for example, 304 in FIG. 3) having two rings.

The under-stress condition 416 gives a crack or fracture 418 in the set cement 404. The set cement 404 may be held together from further propagation of the failure via the sliding-ring polymer additive. The bulky end-groups 408 may prevent de-threading of the polyrotaxane 406 from rings 410 and distribute stress through the sliding-ring polymer and the set-cement matrix.

The recovery condition 420 shows restoration of the set cement 402 via the sliding-ring polymer additive. The restoration may be a bringing together of the set cement 402 reducing the size of the fracture 418. The materials with nonlinear stiffening and elastic behavior introduced to the set cement via the sliding-ring polymer may provide for recovery to the original structure after experiencing the stresses. The recovered condition 422 may approach or effectively reach the pristine condition 402.

The cross-links or cyclic molecules can slide along the polyrotaxane 406 and polymer chains 406, 412 to provide pulley effects to equalize internal stresses. The sliding motion of movable cross-links improves resistant to microcracks and protect the set cement from fractures. This mechanism involved in this type of polymeric additives is different from the mechanism of conventional polymeric materials with fixed junctions.

Upon addition of sliding-ring polymers into cement, these additives bind with the cement particles at sub-nanometer level. Functionalities, such as hydroxyl and carboxylate groups, of the sliding-ring polymer react with metal ions in the cement and form linkages between cement particles and polymeric additives.

Generally, traditional polymers undergo plastic deformation or nonlinear softening behavior, which may contribute to compressive strength. However, this deformation and softening behavior may preclude retention or recovery of the original networks once the traditional polymers are subjected to stresses.

As a contrasting analogy in a biological system, the stress-strain behavior follows nonlinear stiffening behavior that is a characteristic found in spider silks and arterial walls where elasticity is required to preserve the structures. The materials with nonlinear stiffening behavior are recovered to their original structure after experiencing stresses.

Similarly, with the sliding-ring polymers, both nonlinear stiffening and nonlinear softening characteristics are introduced into the set cement so that the compressive strength should not deteriorate. Also, the cement with these additives have elastic behavior. The combination of these properties provide tougher cement with improved shock absorption properties. Evidentiary numerical values and ranges for properties are presented later.

The sliding-ring polymers are developed and employed as additives in cements for hydrocarbon well construction. These additives may also be utilized in above-ground cement applications such as in the construction of roads, buildings, and bridges.

Figure 5:
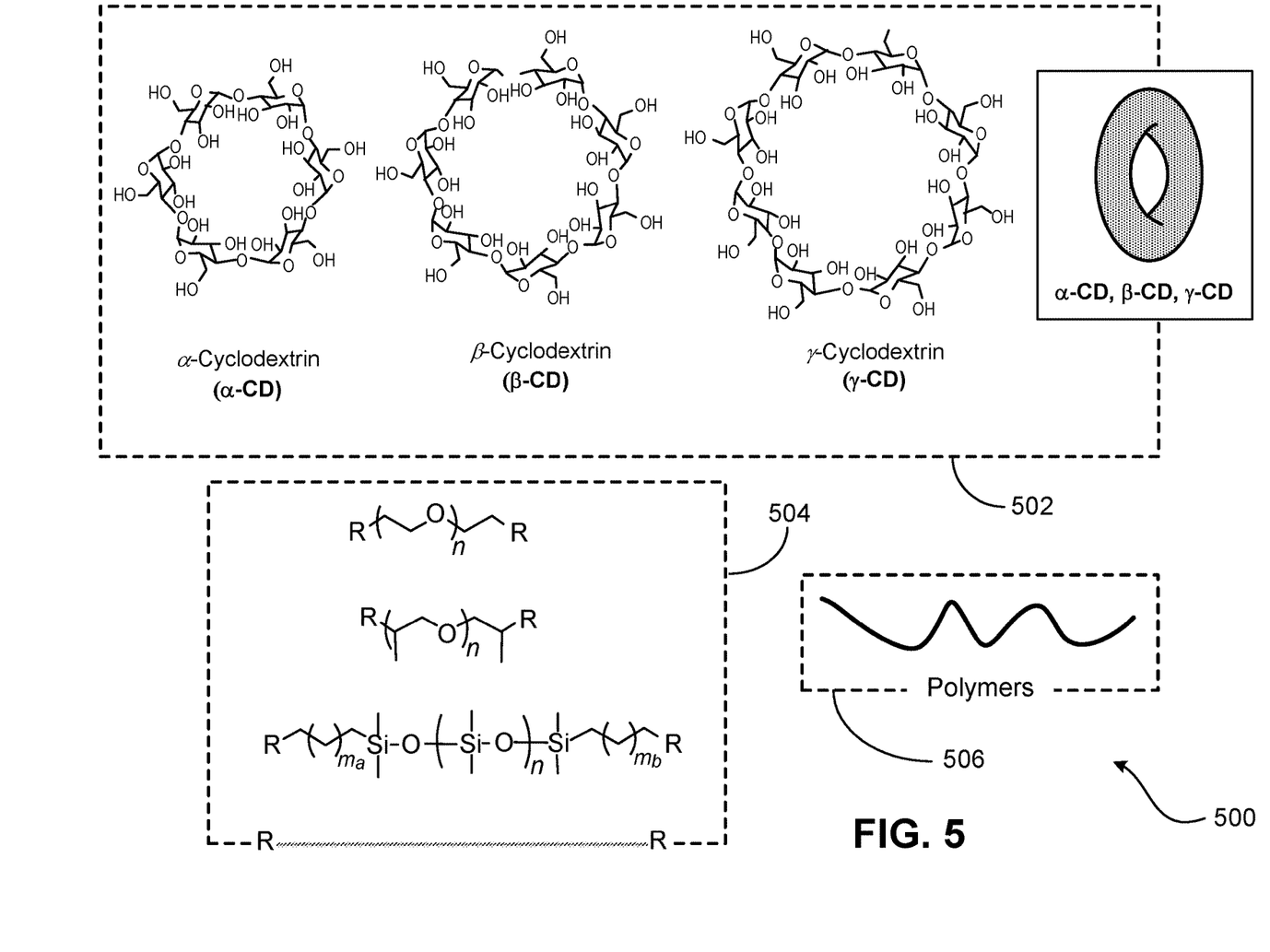
FIG. 5 is a diagram of schematic designations of example chemical constituents for synthesis of a sliding polymer which may be employed as a cement additive.

FIG. 5 is schematic designation of example chemical constituents 500 for synthesis of a sliding-ring polymer that may be employed as a cement additive. Depicted are representative chemical compounds 502, 504, 506 utilized for synthesis of sliding-ring polymers. In this implementation, the ring-type constituents 502 are organic compounds such as cyclodextrin (α, β, or γ). The polyrotaxanes of the sliding-ring polymers may be based on the constituents 504 including, for example, linear polymeric chains such as polyethylene glycol (PEG), polypropylene glycol (PPG), and polysiloxanes. The repeating units $m_a$ and $m_b$ of the polysiloxanes may be alkyl chains. Polymers 506 may be coupled or mechanically bonded to the linear polymeric chains 504 or polyrotaxanes via the ring-type constituents 502 to form the sliding-ring polymer.

Figure 6:
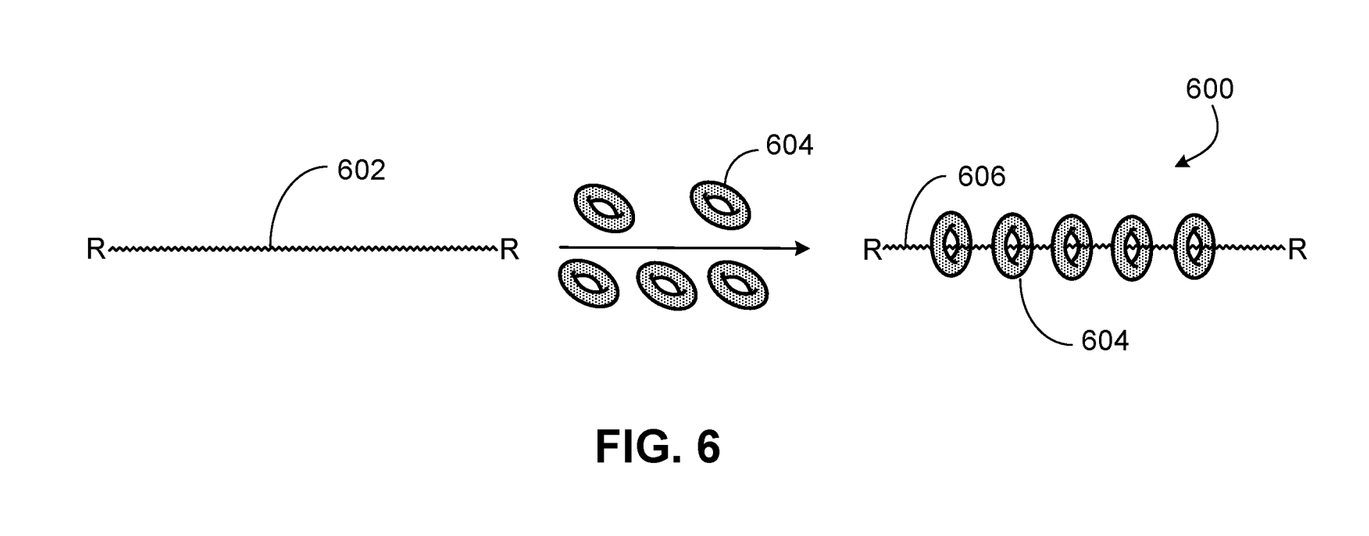
FIG. 6 is a diagram depicting formation (synthesis) of an inclusion complex from a linear polymeric chain.

FIG. 6 depicts formation 600 (synthesis) of an inclusion complex 606 from a linear polymeric chain 602. Ring-type organic compounds 604 are threaded onto the linear polymeric chain 602 via a host-guest chemical route to form the inclusion complex 606. The inclusion complex 606 may be subjected to further synthesis to form a polyrotaxane for a sliding-ring polymer. In implementations with cyclodextrins (α, β, or γ) utilized as the ring-type organic compound 604, the percentage of loadings of the cyclodextrins (α, β, or γ) on the linear polymeric chains 602 as a weight percent (wt %) of the total weight of the inclusion complex 606 may be, for example, in a range of 5 wt % to 80 wt %, a range of 20 wt % to 60 wt %, or a range of 30 wt % to 50 wt %. In one implementation, the percent loading of the cyclodextrin on the linear polymeric chain is about 40 wt %.

In a non-limiting Example 1, syntheses of inclusion complexes included 9.0 grams (g) of carboxylate terminated polyethylene glycol (HOOC-PEG-COOH, MW=20000) and 36.0 g of α-cyclodextrin (α-CD) dissolved in 100 milliliter (mL) de-ionized water and kept refrigerated for 24 hours. The inclusion complex formed as white paste which was dried at room temperature under vacuum or freeze-dried, to obtain a white powder, designated as inclusion complex A.

Similar methods are employed to obtained the inclusion complexes of amine-terminated polypropylene glycol (HOOC-PPG-COOH) and amine-terminated polysiloxanes (HOOC-PS—COOH) with β-cyclodextrin (β-CD) and γ-cyclodextrin (γ-CD), respectively. Moreover, apart from carboxylate terminated polyethylene glycol (PEG), polypropylene glycol (PPG) and polystyrene, variation in terminal functionalities may also involve, for example, amine, azide, isocyanate, carbonyl chloride, halides, and thiol.

Figure 7:
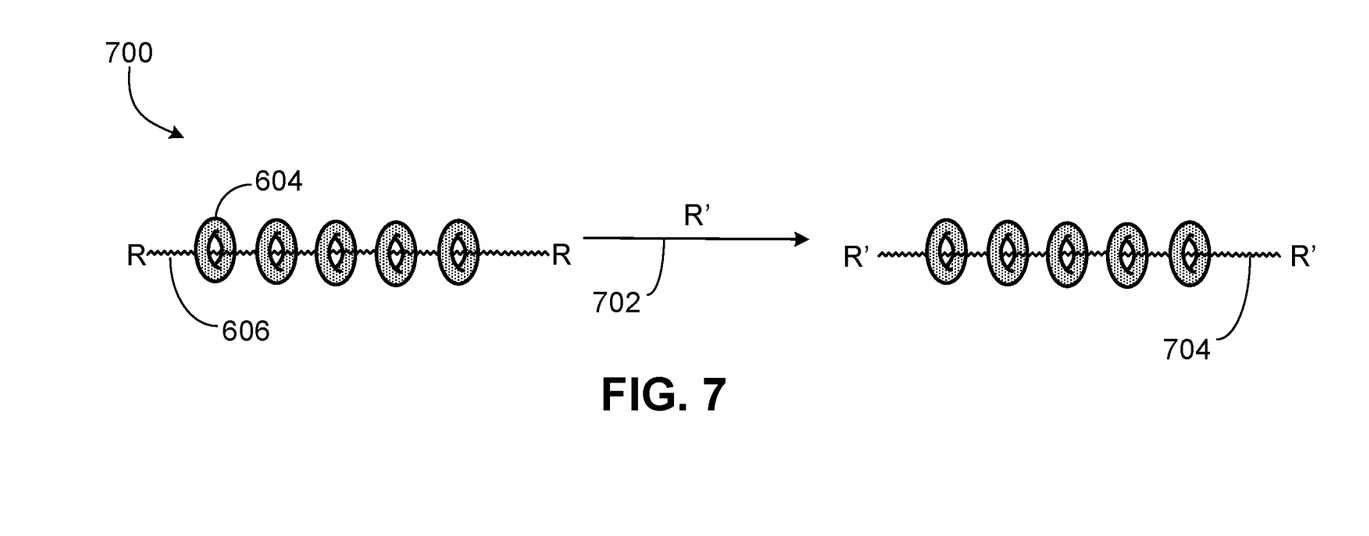
FIG. 7 is a diagram depicting formation (synthesis) of a polyrotaxane from the inclusion complex of FIG. 6.

FIG. 7 depicts formation 700 (synthesis) of a polyrotaxane 704 from the inclusion complex 606 of FIG. 6. The synthesis involves end-capping of the inclusion complex 606. A bulky end-group R' is added 702 to each end of the inclusion complex 606 to form the polyrotaxane 704. This end-group capping of the inclusion complex 606 may be characterized as polyrotaxane 704 synthesis.

In the aforementioned Example 1, functionalities (for example, amine, azide, isocyanate, carbonyl chloride, halides, and thiol) were present in variations of complex A. The capping agent, such as adamantaneacetic acid, 2,4-dinitrofluorobenzene, or amine-terminated aromatic compounds, was employed. In Example 1, the formation of polyrotaxanes were monitored by hydrogen ($^1$H) nuclear magnetic resonance (NMR) spectroscopy. The characteristic resonances of the polyrotaxanes were observed at 8.8 mass part per million (ppm) and 8.2 ppm. The resonances were 7.3 ppm for the aromatic capping agent, 8.81 ppm for secondary amines, 5.5 ppm to 4.4 ppm for hydroxyl groups of cyclodextrins, and 3.7 to 3.3 ppm for methylene protons of the polymeric chains. The thermal stability (resistance to decomposition) of polyrotaxanes was up to 250° C. for PEG-based polyrotaxanes, up to 300° C. for PPG-based polyrotaxanes, and up to 400° C. for polysiloxanes-based polyrotaxanes. The thermal stability of polyrotaxanes ranged from 150° C. to 250° C. for PEG-based polyrotaxanes, 150° C. to 300° C. for PPG-based polyrotaxanes, and 150° C. to 400° C. for polysiloxanes-based polyrotaxanes.

Figure 8:
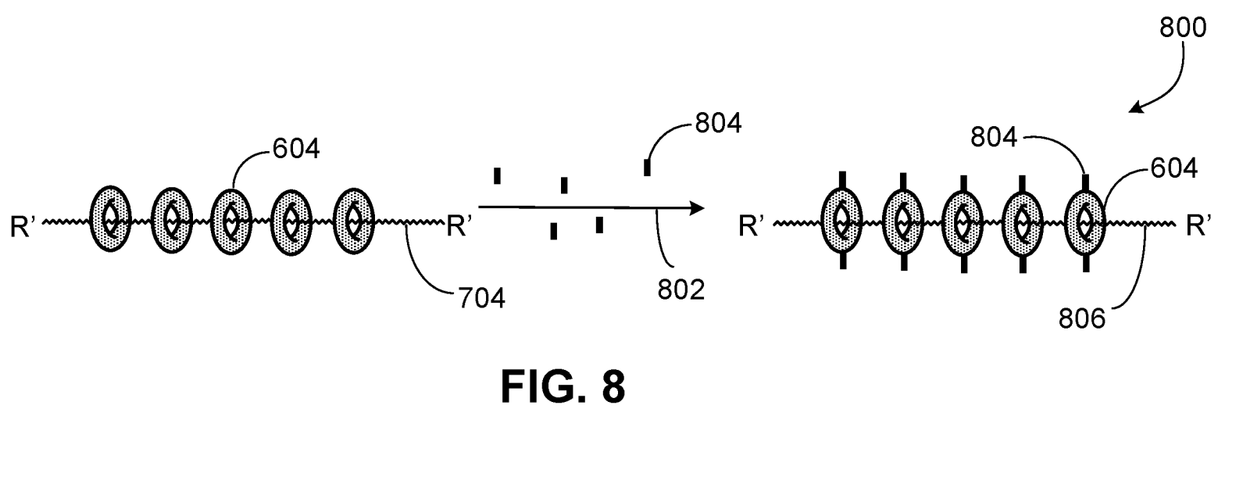
FIG. 8 is a diagram depicting functionalization of the polyrotaxane of FIG. 7 to give a functionalized polyrotaxane.

FIG. 8 depicts functionalization 800 of the polyrotaxane 704 (see also FIG. 7) to give a functionalized polyrotaxane 806. The functionalization in particular is functionalization of the surface of the ring-type organic compounds 604. As mentioned, the ring-type organic compounds 604 in certain implementations may be cyclodextrins. Functional groups 804 are added 802 to the surface of the ring-type organic compounds 604 to give a functionalized polyrotaxane 806.

In the aforementioned Example 1, 3.5 g of polyrotaxane A was dissolved in of 1 normality (N) aqueous NaOH (350 mL) at 0° C. to 5° C. Propylene oxide (26.8 g) was added drop-wise and the mixture stirred overnight from with the temperature changing from 0° C. to room temperature with the melting of ice in the bath. The functionalized polyrotaxanes was dialyzed against de-ionized water for 3 days. The water was evaporated or the solution was freeze dried under vacuum to obtain functionalized polyrotaxane A.

This functionalization in Example 1 was based on hydroxypropylation. However, the functional groups (for example, methylation, hydroxypropylation, tritylation, acetylation, trimethylsilylation, phenylcarbamation, dansylation, nitration) were also included to generate a series of functionalized polyrotaxanes. The functionalization of hydroxypropylated was confirmed by $^1$H NMR spectroscopy, which showed changes in the chemical shifts between 5.65 ppm to 3.5 ppm (corresponding to hydroxypropylated groups).

Figure 9:
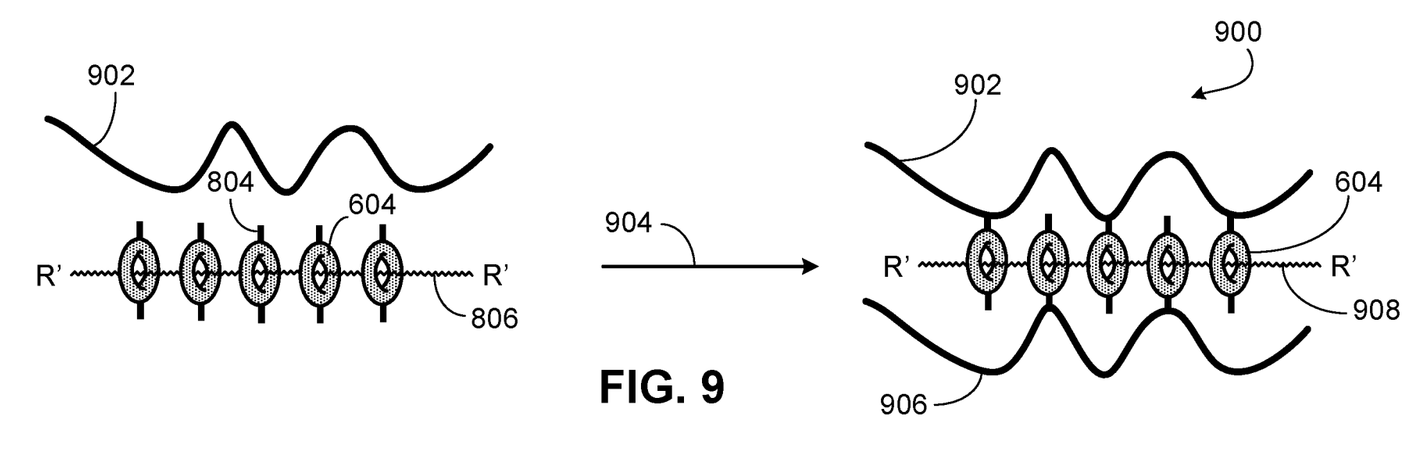
FIG. 9 is a diagram depicting formation (synthesis) of a sliding-ring polymer utilizing the functionalized polyrotaxane of FIG. 8.

FIG. 9 depicts formation 900 (synthesis) of a sliding-ring polymer 908 utilizing the functionalized polyrotaxane 806 of FIG. 8. A polymer 902 is anchored or cross-linked 904 to rings 604 via the functional group 804 on the rings 604. A second polymer 906 may be similarly anchored or cross-linked to rings 604. Thus, the sliding-ring polymer 908 includes the polyrotaxane 704 (FIG. 7) and the polymers 902, 906.

In the aforementioned Example 1, 9.5 g of polyacrylic acid (MW=450000) was dissolved in 190 mL dimethyl sulfoxide, and 0.12 g of 1,1'-carbonyldiimidazole dissolved in 5 mL dimethylsulfoxide added. The mixture was stirred at 50° C. for 12-15 hours under inert atmosphere. The reaction mixture was cooled to room temperature. A solution of functionalized polyrotaxane A (0.5 g in 5 mL dimethylsulfoxide) was added over 30 minutes under inert atmosphere with stirring. After stirring for 30 minutes at room temperature, the reaction mixture was heated to in the range of 65° C. to 70° C. for 72 hours. Sliding-ring polymer was precipitated from tetrahydrofuran and filtered. The polymer was dried at room temperature under vacuum or freeze-dried, to obtain sliding-ring polymer A. The anchoring of polyacrylic acid on the polyrotaxnes was defined by the resonances for polyacrylic acis in the $^1$H NMR spectroscopy. The appearance of ester stretching band at 1730 reciprocal centimeter ($cm^{-1}$) in Fourier-transform infrared spectroscopy (FTIR) for the sliding-ring polymer indicated cross-linking of the carboxylic acid moieties of polyacrylic acid to the hydroxyl groups of polyrotaxanes.

Other than polyacrylic acid, polymers with large molecular weight (for example, having a weight-average molecular weight (molecular mass) greater than 10,000 grams per mole) and functionalities that may be employed to obtain the sliding-ring polymers include carboxylic acid, maleic acid, and amine groups. The amount of polyrotaxanes anchored in sliding-ring polymers can vary from 1 wt % to 80 wt %, 2 wt % to 60 wt %, or 5 wt % to 15 wt %. Lastly, in certain implementations, the thermal stability of sliding-ring polymers can range from 150 to 250° C. for PEG-based polyrotaxanes, 150 to 300° C. for PPG-based polyrotaxanes, and 150 to 400° C. for polysiloxanes-based polyrotaxanes.

Figure 10:
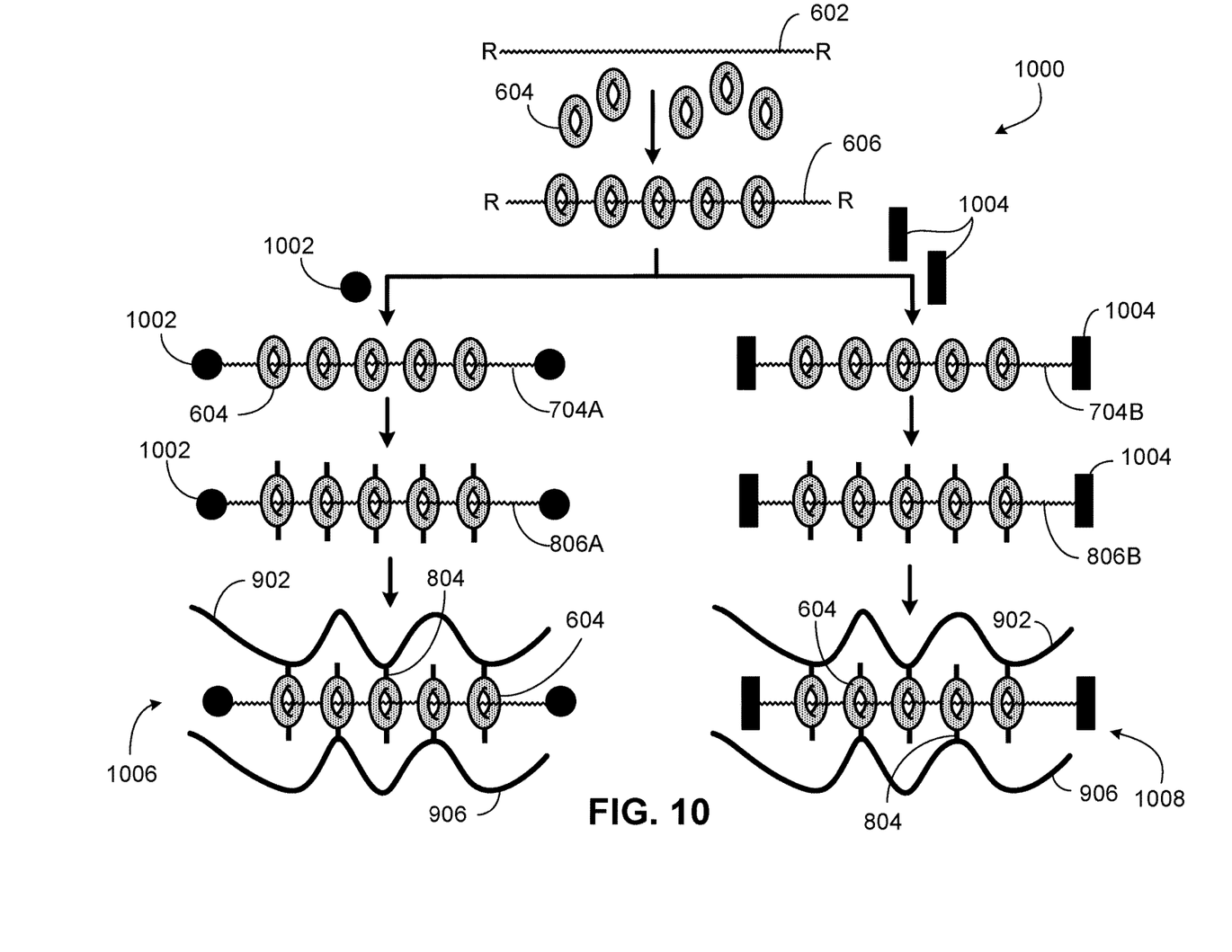
FIG. 10 is a diagram depicting syntheses utilizing functionalized polymer and organic-inorganic hybrids as capping agents for syntheses of polyrotaxanes and sliding-ring polymers.

FIG. 10 is a diagram 1000 depicting syntheses utilizing functionalized polymer 1002 and organic-inorganic hybrids 1004 as capping agents for syntheses of polyrotaxanes 704A, 704B and sliding-ring polymers 1006, 1008. The technique may employ the functionalized, nanoscale polymer particles 1002 or organic-inorganic hybrids 1004 having functionalities for formation of the polyrotaxanes 704A or 706B, respectively. Then, the formation of the sliding-ring polymers 1006 or 1008 may be from the sliding polyrotaxanes 704A or 704B, respectively. The sliding-ring polymers 1006, 1008 may be analogous to the sliding ring polymer 908 of FIG. 9.

In FIG. 10, as discussed earlier with respect to FIG. 6, ring-type organic compounds 604 are threaded onto the linear polymeric chain 602 via a host-guest chemical route to form the inclusion complex 606. Then, polymers 1002 or inorganic particles or layered organic-inorganic hybrids 1004 (of nanoscale dimension) with functionalities, such as carboxylate, amine, azide, isocyanate, carbonyl chloride, halides, and thiol, are employed as capping agent. This capping may be via the procedure discussed earlier with respect to FIG. 7. The polymer particles 1002 and organic-hybrids 1004 as a capping agent may be analogous to the end groups R' added as indicated by arrow 702 in FIG. 7 to give the polyrotaxanes 704, 704A, or 704B.

Lastly, in FIG. 10, as discussed earlier with respect to FIGS. 8 and 9, functionalization of the polyrotaxanes 704A, 704B rings 604 may be performed to give the functionalized polyrotaxanes 806A, 806B, and then large molecular-weight polymers 902, 904 (for example, having a weight-average molecular weight (molecular mass) of at least 10,000 grams per mole) anchored to the functionalized rings 604 to give the sliding-ring polymers 1006, 1008.

In the present disclosure, sliding-ring polymers are employed as an additive in cements (cement formulations). Table 1 gives example cement formulations in which Example 4 (Formulation C) has a sliding-ring polymer as a cement additive.

All three respective formulations in Examples 2, 3, and 4 were prepared per API Specification 10A (24th Edition, December 2010). The API Specification 10A is entitled "Specification for Cements and Materials for Well Cementing" and is the same as International Organization for Standardization (ISO) 10426-1 (Third Edition, 2009-12-15). Samples of set cements were obtained by formulating a cement slurry, pouring the cement slurry into a 1-inch diameter cylinder, and curing the cement slurry at 180° F. and 3000 pounds per square inch gauge (psig) for 24 hours. Samples of the cured cement (set cement) of 1-inch size and 2-inch size were used to analyze the mechanical properties of the set cement under ambient and downhole conditions. The cement in all three formulations is Portland cement as API Class G cement. Additional description of preparing the formulations is given immediately following Table 1. The density of all set cement samples was measured according to API Specification 10A before mechanical test analyses.

TABLE 1

Example Cement Formulations

| Formulations | Constituents | Amount | % bwoc |
|---|---|---|---|
| Example 2: Formulation A | Class G cement | 205.8 g | |
| | Suspending agent | 0.41 g | 0.2 |
| | De-ionized water | 136.2 g | |
| | Defoamer | 0.5 mL | |
| Example 3: Formulation B | Class G cement | 205.8 g | |
| | Suspending agent | 0.41 g | 0.2 |
| | Polyacrylic acid | 3.1 g | 1.5 |
| | Dispersant | 0.1 mL | |

TABLE 1-continued

Example Cement Formulations

| Formulations | Constituents | Amount | % bwoc |
|---|---|---|---|
| | De-ionized water | 136.2 g | |
| | Defoamer | 0.5 mL | |
| Example 4: Formulation C | Class G cement | 205.8 g | |
| | Suspending agent | 0.41 g | 0.2 |
| | Sliding-ring polymer | 3.1 g | 1.5 |
| | Dispersant | 0.1 mL | |
| | De-ionized water | 136.2 g | |
| | Defoamer | 0.5 mL | |

Example 2: Formulation A. Class G cement was blended with a suspending agent. This blended cement mixture was added into de-ionized water at 8000 revolutions per minute (rpm), followed by mixing at 12,000 rpm for 35 seconds. Further, 0.5 mL defoamer was added and the mixture stirred at 12,000 rpm for 10 seconds. The resulting cement slurry was poured into 1-inch diameter cylinder and cured at 180° F. and 3000 pounds per square inch gauge (psig) for 24 hours. From this cured cement, cured cement samples (set cement) of 1-inch size and 2-inch size were used for mechanical testing.

Example 3: Formulation B. Class G cement was blended with a suspending agent. This blended cement mixture was added into a solution of polyacrylic acid, de-ionized water, and dispersant at 8000 rpm, followed by mixing at 12,000 rpm for 35 seconds. Further, 0.5 mL defoamer was added and the mixture stirred at 12,000 rpm for 10 seconds. The resulting cement slurry was poured into 1-inch diameter cylinder and cured at 180° F. and 3000 psig for 24 hours. From this cured cement, cured cement samples (set cement) of 1-inch size and 2-inch size were used for mechanical testing.

Example 4: Formulation C. Class G cement was blended with a suspending agent. The blended cement mixture was added into a solution of sliding-ring polymer, de-ionized water, and dispersant at 8000 rpm, followed by mixing at 12,000 rpm for 35 seconds. Further, 0.5 mL defoamer was added and the mixture stirred at 12,000 rpm for 10 seconds. The resulting cement slurry was poured into 1-inch diameter cylinder and cured at 180° F. and 3000 psig for 24 hours. From this cured cement, cured cement samples (set cement) of 1-inch size and 2-inch size were used for mechanical testing.

Suspending agents (for example, alpha or beta-hydroxy carboxylic acid) may be chemicals that are hydrate upon mixing with water to provide better suspension of the cement particles in the slurry and restrict settling of the cement particles in the cement slurry. The suspending agent in Formulations A, B, and C is hydroxyethyl cellulose which has the tradename Narosol™. The dispersant may facilitate maintaining the cement slurry at the desired viscosity. Common dispersants may be based on polycarboxylic acids. The dispersant in Formulations A, B, and C is Ethacrylate G having polycarboxylate ether and supplied from Arkema Chemicals Company headquartered in Colombes, France. Defoamers are may be based on glycols and polyglycols which restrict foam formations. Defoamers may reduce formation of air bubbles or trapped air in the cement slurry. The defoamer in Formulations A, B, and C is a silicon-based chemical compound known as Defoamer 7500 L (commercial name) from Fritz Industries, Inc. headquartered in Houston, Tex., USA.

In the Examples, the cement formulations were cured under 20 MPa of pressure to give set cements. The pressure of 20 MPa may be representative as a typical downhole pressure. The downhole pressure may be greater than 20 MPa. The terms cured and set may be synonymous. Testing was performed on the cement formulations as cured or set. Results of testing on samples of the formulations set cement is given in Tables 2, 3, and 4.

TABLE 2

Compressive strengths under confined pressure of 20 MPa at 77° F.

| Set-cement samples | Compressive strength (MPa) |
|---|---|
| Formulation A | 28 |
| Formulation B | 21 |
| Formulation C | 34 |

As listed in Table 2, the compressive strength for formulations A, B, and C is 28, 21, and 34 MPa, respectively, under the confined pressure of 20 MPa and temperature of 77° F. The confined pressure may mean the pressure exerted on the set-cement samples from most or all directions. As can be seen, the set cement of the formulation (Formulation C) with the sliding-ring polymer additive had the greatest compressive strength. Compressive strength can be stated with or without the confined pressure and temperature.

In general, the compressive strengths for cement formulations of the present techniques having sliding-ring polymers can be, for example, in ranges of 10 MPa to 60 MPa, 20 MPa to 50 MPa, or 35 MPa to 45 MPa. For these compressive strengths, the confined pressures can be, for example, in ranges of 0.1 MPa to 150 MPa, 10 MPa to 100 MPa, or 20 MPa to 40 MPa, and the temperatures, for example, in ranges of 77° F. to 450° F., 125° F. to 350° F., or 150° F. to 200° F. The properties in Table 3 and Table 4 are given in gigapascal (GPa).

TABLE 3

Bulk, Shear, and Young's modulus under confined pressure at 77° F

| Set-cement samples | #Bulk Modulus (GPa) | *Shear Modulus (GPa) | *Young's Modulus (GPa) |
|---|---|---|---|
| Formulation A | 3.5 | 3.6 | 7.94 |
| Formulation B | 3.47 | 3.46 | 8.36 |
| Formulation C | 3.36 | 2.94 | 9.53 | confined pressure = 10.8 MPa
*confined pressure = 20 MPa

TABLE 4

Bulk, Shear, and Young's modulus under confined pressure at 180° F.

| Set-cement samples | #Bulk modulus (GPa) | *Shear modulus (GPa) | *Young's Modulus (GPa) |
|---|---|---|---|
| Formulation A | 3.11 | 3.3 | 11.28 |
| Formulation B | 3.52 | 3.3 | 7.48 |
| Formulation C | 3.01 | 3.02 | 8.89 | confined pressure = 10.8 MPa
*confined pressure = 20 MPa

As tabulated, Formulation C gives the greatest Young's modulus at 77° F. but not the greatest Young's modulus at 180° F. It may be generally beneficial to have this less Young's modulus (8.89 GPa) at greater temperature (180° F. compared to 77° F.) because this a relatively reduced value of Young's modulus correlates with beneficial elasticity or tensile properties. At the greater temperature (180° F.), the mobility of polymeric chains of polymeric additives introduces elasticity. This is a reason for the less value (8.89 GPa) of Young's modulus at 180° F.

In general, the bulk modulus, shear modulus and Young's modulus for set cement from cement formulations of the present techniques may be in ranges of 0.1 GPa to 40 GPa, 3 Pa to 25 GPa, or 5 GPa to 20 GPa under confined pressures in ranges of 0.1 MPa to 150 MPa, 10 MPa to 100 MPa, or 20 MPa to 40 MPa and temperatures in ranges of 77° F. to 450° F., 125° F. to 350° F., or 150° F. to 200° F.

Mechanical characteristics, such as tensile properties, of the set cement are beneficially increased in value due to the sliding-ring polymer. The presence of the sliding ring-polymer generally reduces Young's modulus (for example, at 180° F.) and this reduction in modulus correspond to increasing tensile properties (flexibilities). The presence of the sliding-ring polymer may preserve the compressive strength of the set cement and also improved flexibilities, a property called toughness, in the set cement. Some mechanical properties of the set cement are beneficially decreased in value due the sliding-ring polymer. For example, the presence of the sliding-ring polymer beneficially decreases stiffness. Stiffness is inversely related to Young's modulus (flexibility). In another example, the decrease in the Young's modulus improves toughness.

Figure 11:
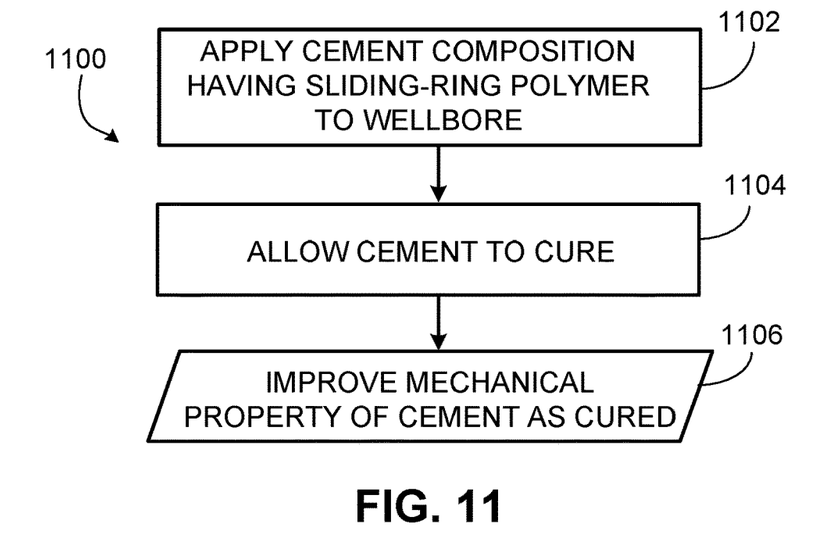
FIG. 11 is a block flow diagram of a method of cementing a wellbore in a geological formation.

FIG. 11 is a method 1100 of cementing a wellbore in a geological formation. The cementing may include primary cementing, secondary cementing, remedial cementing, and squeeze cementing. The cement has a sliding-ring polymer as a cement additive.

At block 1102, the method includes applying a cement composition into the wellbore. The cement composition includes cement and a sliding-ring polymer. In certain implementations, the cement is Portland cement. For primary cementing, the applying of the cement composition into the wellbore may include applying the cement composition into an annulus between a wellbore casing and the geological formation.

The sliding-ring polymer may include polyrotaxanes. A polyrotaxane has multiple rings threaded on a linear polymeric chain. The rings may each being a ring-type organic compound such as a cyclodextrin. In implementations, the rings do not form a covalent bond with the linear polymeric chain. The rings as threaded may form a movable cross-linked mechanical bond with the linear polymeric chain.

In certain implementations, the polyrotaxane of the sliding-ring polymer include two end groups to restrict de-threading through the rings. The two end groups include a first end group on a first end of the linear polymeric chain and a second end group on a second end of the linear polymeric chain. Furthermore, in some implementations, the sliding-ring polymer may have a first polymer cross-linked to a first set of the rings and a second polymer cross-linked to a second set of the rings (see, for example, FIG. 9).

At block 1104, the method includes allowing the cement composition to cure or harden to give set cement having the sliding-ring polymer. In some implementations, the sliding-ring polymer decreases stiffness of the set cement. Inclusion of the sliding-ring polymer improves one or more mechanical properties of the set cement as cured or hardened, as indicated in block 1106.

In some embodiments, the sliding-ring polymer utilized in method 1100 may be synthesized by: (1) forming an inclusion complex having multiple rings threaded on a linear polymeric chain via a host-guest chemical route, the multiple rings being a ring-type organic compound; (2) end-capping the inclusion complex with an end group to restrict de-threading of the rings; and (3) anchoring a first polymer on a first set of the rings and anchoring a second polymer on a second set of the rings. The synthesizing of the sliding polymer includes functionalizing the multiple rings for the anchoring including cross-linking.

In other embodiments, the sliding-ring polymer utilized in method 1100 may be synthesized by: (1) forming an inclusion complex having multiple rings threaded on a linear polymeric chain via a host-guest chemical route, the multiple rings each being a ring-type organic compound; (2) forming a polyrotaxane involving end-capping the inclusion complex with a respective end group on each end to restrict de-threading of the rings; and (3) forming the sliding-ring polymer involving cross-linking a first polymer to a first set of the rings and cross-linking a second polymer to a second set of the rings. The synthesizing of the sliding-ring polymer may include functionalizing the multiple rings for the cross-linking. The functionalizing may include hydroxypropylation.

Figure 12:
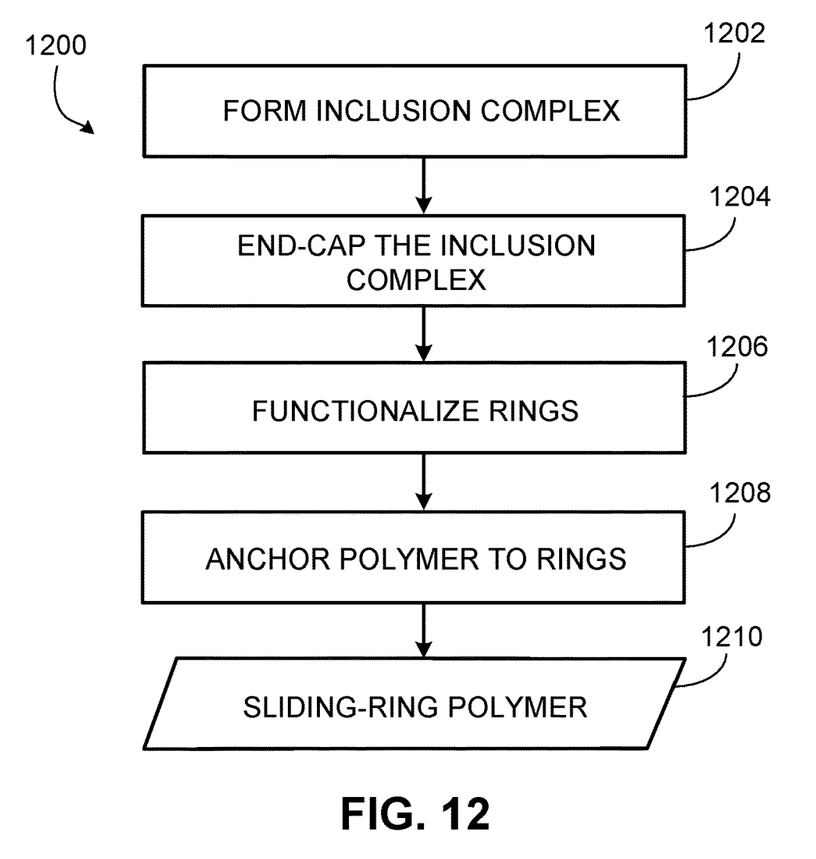
FIG. 12 is a block flow diagram of a method of synthesizing a sliding-ring polymer as a cement additive.

FIG. 12 is a method 1200 of synthesizing a sliding-ring polymer as a cement additive. The sliding-ring polymer may be utilized in the method 1100 of FIG. 11. The sliding-ring polymer may be a cement additive in the aforementioned cement compositions.

At block 1202, the method includes forming inclusion complexes each having multiple rings threaded on a linear polymeric chain via a host-guest chemical route. The multiple rings may each be a ring-type organic compound such as a cyclodextrin. In implementations, the rings or ring-type organic compounds do not form a covalent bond with the linear polymeric chain(s). The rings or ring-type organic compounds as threaded form a movable cross-linked mechanical bond with the linear polymeric chain. At block 1202, the method forms the inclusion complex.

At block 1204, the method includes end-capping the inclusion complex to form a polyrotaxane. The method may include forming a polyrotaxane involving end-capping the inclusion complex with an end group(s) to restrict de-threading through the rings. As mentioned, the rings may be ring-type organic compounds. The end group may include two end groups for each inclusion complex, including a first end group on a first end of the linear polymeric chain and a second end group on a second end of the linear polymeric chain. The end group may a bulky end group that prevents de-threading of the rings. The end-capping may include incorporating a polymer particle having a functional group onto the inclusion complex as the end group. The end-capping may include incorporating an organic-inorganic hybrid compound having a functional group onto the inclusion complex as the end group. In some embodiments, the sliding-ring polymer (formed in block 1208) may include the polyrotaxane in a range of 2 weight percent to 60 weight percent.

At block 1206, the method includes functionalizing the rings. The method may include functionalizing the ring-type organic compounds of the polyrotaxanes. A surface or outer surface of the rings may be functionalized. The functionalizing may include adding or attaching a respective functional group to each of the rings. The functionalization may be performed so that the rings can be anchored or cross-linked with polymers.

At block 1208, the method includes anchoring polymer to the functionalized rings to give a sliding-ring polymer 1210. Forming the sliding-ring polymer 1210 may include anchoring a first polymer on a first set of the rings and anchoring a second polymer on a second set of the rings. The anchoring may be or involve cross-linking. Again, the rings may be ring-type organic compounds. The anchoring (for example, cross-linking) of the polymers may include anchoring a first polymer on a first set of ring-type compounds of a single polyrotaxane and anchoring a second polymer on a second set of ring-type compounds of the single polyrotaxane.

A polyrotaxane may be a type of mechanically interlocked molecule consisting of strings and rings, in which multiple rings are threaded onto a molecular axle and prevented from dethreading by two bulky end groups. As oligomeric or polymeric species of rotaxanes, polyrotaxanes are also capable of converting energy input to molecular movements via the ring motions. Although there are generally no covalent bonds between the axes and rings, polyrotaxanes are stable due to the free-activation energy (Gibbs energy) to be overcome to withdraw rings from the axes in this topologically interlocked structure. Also, the rings are capable of shuttling along and rotating around the axes freely, which leads to an internal degree of freedom of polyrotaxanes. In sliding-ring materials, crosslinks of rings can pass along the axes freely to equalize the tension of the threading polymer networks, which is similar to pulleys. A polyrotaxane may be a necklace-like supramolecule in which many cyclic molecules are threaded into a single polymer chain and can be cross-linked to produce functional polymeric materials. The resulting materials have movable cross-linking giving properties different from other polymer networks with fixed covalent bonds.

The synthesis of polyrotaxanes may include threading of preformed main chain molecules through preformed rings. Through mixing the main chain polymers and the rings in solution, polyrotaxanes can be obtained after adding bulky stoppers to prevent the rings from dethreading from the chains. The number of rings on each chain may depend on the threading equilibrium. Kinetic features due to the concentration of chain ends and entropic effects can be a consideration. Template threading may be implemented to increase dynamically the number of threading rings by changing the equilibrium constant.

A type of polymer network is sliding-ring materials formed by cross-linking polyrotaxane which is a supramolecular architecture with topological characteristics. In the network, polymer chains are topologically interlocked by figure-of-eight cross-links. Hence, these cross-links can pass along the polymer chains freely to equalize the tension of the threading polymer chains similarly to pulleys. The structure and physical properties of the polymeric materials are different from conventional cross-linked or non-cross-linked materials. For instance, the sliding-ring gel or elastomer may show Young's modulus not proportional to the cross-linking density and lower than those of chemical gels with the same density. Characteristics of the sliding-ring gel are not limited to cross-linked gels but may also include cross-linked elastomers and cross-linked polymeric materials without solvent.

As for the dispersants included in cement compositions, the thinning effects of dispersants can help modify slurry rheology to facilitate mixing and placement of the cement slurry. Adding dispersants to the cement slurry can lower friction and pressure (pump head demand) during pumping of the cement slurry. Dispersants, also known as friction reducers, may be employed in cement slurries to improve the rheological properties that relate to the flow behavior of the slurry. Dispersants are used primarily to decrease the frictional pressures of cement slurries while the cement slurry is being pumped into the well. Another advantage of dispersants may be that the dispersants in slurries provide for slurries with solids-to-water ratios that promote rheological properties. Dispersants may reduce, minimize, or prevent flocculation of cement particles because the dispersant adsorbs onto the hydration cement particle, causing the particle surfaces to be negatively charged and repel each other. Thus, water that otherwise would have been entrained in the flocculated system also becomes available to further lubricate the slurry. Types of dispersants may include poly-unsulfonated naphthalene (PNS) and hydroxycarboxylic acids such as citric acid. In one implementation, this liquid form of PNS has a solids content of at least 40 weight percent. Citric acid is used as a dispersant in seawater cement slurries.

An embodiment is a cement composition including cement (for example, Portland cement) and a sliding-ring polymer. The cement composition may include a suspending agent and a dispersant. The sliding-ring polymer may have cyclodextrin rings. The sliding-ring polymer to bind with cement particles of the cement such as at sub-nanometer level involving to bind functionalities of the sliding-ring polymer with metal ions of the cement. In one implementation, the cement composition includes water and is a cement slurry. In another implementation, the cement composition is a set-cement composition with the cement as set cement. The sliding-ring polymer may promote distribution of stresses in the cement as set. The sliding-ring polymer may decrease Young's Modulus of the cement as set. The cement composition as cured or hardened may have a compressive strength, for example, in a range of 10 megapascal (MPa) to 150 MPa. The sliding-ring polymer may decrease shear modulus of the set cement. The sliding-ring polymer may decrease stiffness of the cement as cured or set.

The sliding-ring polymer may incorporate a polyrotaxane having multiple rings threaded on a polymeric chain, the rings each being a ring-type organic compound. In implementations, the rings do not form a covalent bond with the linear polymeric chain. The rings as threaded may form a movable cross-linked mechanical bond with the linear polymeric chain. The sliding-ring polymer may include the polyrotaxane in a range of 2 weight percent to 60 weight percent. The polymeric chain may be a linear polymeric chain. The polyrotaxane may have an end group on the linear polymeric chain to restrict de-threading of the rings. The end group may be two end groups including a first end group on a first end of the linear polymeric chain and a second end group on a second end of the linear polymeric chain. The sliding-ring polymer may include a first polymer anchored to a first set of the rings and a second polymer anchored to a second set of the rings. The anchored may be cross-linked. Again, the rings may be a ring-type organic compound such as a cyclodextrin.

Another embodiment is a cemented wellbore in a geological formation, the wellbore including a casing and set cement (for example, Portland cement) in an annulus between the casing and the geological formation, the set cement including a sliding-ring polymer. The sliding-ring polymer may have cyclodextrin rings. The sliding-ring polymer may bind with cement particles of the set cement. The sliding ring polymer may increase stiffness of the set cement. The set cement have a compressive strength of at least 50 megapascal (MPa). The sliding-ring polymer may have multiple rings threaded on a linear polymeric chain, each ring being a ring-type organic compound. In implementations, the rings do not have a covalent bond with the linear polymeric chain. The rings as threaded may have a movable cross-linked mechanical bond with the linear polymeric chain. The linear polymeric chain may have an end group to restrict de-threading of the rings. The end group may be two end groups including a first end group on a first end of the linear polymeric chain and a second end group on a second end of the linear polymeric chain. In implementations, a compound having the linear polymeric chain, the rings, and the end group is a polyrotaxane. The ring-type organic compound may be a cyclodextrin. The sliding-ring polymer may include a first polymer cross-linked to respective surfaces of a first set of the rings and a second polymer cross-linked to respective surfaces of a second set of the rings.

Yet another embodiment is a method of synthesizing a sliding-ring polymer, including forming an inclusion complex having multiple rings threaded on a linear polymeric chain via a host-guest chemical route. The multiple rings each are a ring-type organic compound such as cyclodextrin. The method includes forming a polyrotaxane including end-capping the inclusion complex with an end group to restrict de-threading of the rings. The method includes forming the sliding-ring polymer including anchoring (for example, cross-linking) a first polymer on a first set of the rings and anchoring a second polymer on a second set of the rings. The method may include functionalizing a surface of the rings, respectively, prior to forming the sliding-ring polymer to promote the anchoring or cross-linking. The functionalizing may involve adding or attaching a respective functional group to each of the rings. In implementations, the rings do not form a covalent bond with the linear polymeric chain. The rings as threaded may form a movable cross-linked mechanical bond with the linear polymeric chain. The end group may be two end groups that are a first end group on a first end of the linear polymeric chain and a second end group on a second end of the linear polymeric chain. The end group may be two bulky end groups, one on each end of the linear polymeric chain, to prevent de-threading of the rings. The end-capping may include incorporating a polymer particle having a functional group onto the inclusion complex as the end group. The end-capping may include incorporating an organic-inorganic hybrid compound having a functional group onto the inclusion complex as the end group. The sliding-ring polymer may have the polyrotaxane in a range of 2 weight percent to 60 weight percent.

Yet another embodiment is a method of synthesizing sliding ring polymers as a cement additive, including forming inclusion complexes having ring-type organic compounds threaded on linear polymeric chains via a host-guest chemical route. The method includes forming polyrotaxanes by end-capping the inclusion complexes with end groups to restrict de-threading of the ring-type organic compounds. The method includes functionalizing the ring-type organic compounds of the polyrotaxanes, and forming sliding ring polymers by anchoring polymers on the ring-type organic compounds. The anchoring of the polymers may include anchoring a first polymer on a first set of ring-type compounds of a single polyrotaxane and anchoring a second polymer on a second set of ring-type compounds of the single polyrotaxane. The anchoring may be cross-linking. In implementations, the ring-type organic compounds do not form a covalent bond with the linear polymeric chains. The ring-type organic compounds as threaded may form a movable cross-linked mechanical bond with the linear polymeric chains.

A number of implementations have been described. Nevertheless, it will be understood that various modifications may be made without departing from the spirit and scope of the disclosure.

What is claimed is:

1. A cement composition comprising:
cement at an amount greater than any other constituent in the cement composition;
water at an amount greater than any other constituent in the cement composition, except for the cement;
a sliding-ring polymer comprising a polyrotaxane and a polymer, wherein the polymer is bonded to the polyrotaxane; and
a defoamer that restricts foam formation in the cement composition, wherein the cement composition is a cement slurry.

2. The composition of claim 1, wherein the cement comprises Portland cement, and wherein the sliding-ring polymer comprises cyclodextrin rings.

3. The composition of claim 1, wherein the polyrotaxane comprises multiple rings threaded on a polymeric chain, the rings each comprising a cyclic organic compound.

4. The composition of claim 3, wherein the rings do not form a covalent bond with the polymeric chain, wherein the rings as threaded form a movable cross-linked mechanical bond with the polymeric chain, and wherein the sliding-ring polymer comprises the polyrotaxane in a range of 2 weight percent to 60 weight percent.

5. The composition of claim 3, wherein the polymeric chain comprises a linear polymeric chain, wherein the polyrotaxane comprises an end group on the linear polymeric chain to restrict de-threading of the rings, wherein the cement comprises cement particles, and wherein the sliding-ring polymer binds with the cement particles.

6. The composition of claim 5, wherein the end group comprises two end groups comprising a first end group on a first end of the linear polymeric chain and a second end group on a second end of the linear polymeric chain, wherein the cement comprises metal ions, wherein the sliding-ring polymer binds with the cement particles through functionalities of the sliding-ring polymer reacting with the metal ions of the cement, and wherein the sliding-ring polymer promotes distribution of stresses in the cement as set.

7. The composition of claim 3, wherein the polymer bonded to the polyrotaxane comprises a first polymer anchored to a first set of the rings and a second polymer anchored to a second set of the rings.

8. The composition of claim 7, wherein anchored comprises cross-linked, wherein the cyclic organic compound comprises a cyclodextrin, wherein the cement composition comprises a suspending agent and a dispersant, and wherein the sliding-ring polymer decreases Young's Modulus of the cement as set.

9. The composition of claim 1, wherein the sliding-ring polymer decreases stiffness of the cement as set.

10. The composition of claim 1, wherein the cement composition as cured comprises a compressive strength in a range of 10 megapascal (MPa) to 150 MPa.

11. The composition of claim 1, wherein the cement composition is set cement comprising the cement, the water, the sliding-ring polymer, and the defoamer, and wherein the sliding-ring polymer decreases shear modulus of the set cement.

12. The composition of claim 1, comprising the cement at greater than half of the cement composition by weight.

13. The composition of claim 1, wherein the defoamer reduces formation of air bubbles or trapped air in the cement composition.

14. The composition of claim 1, comprising a dispersant, wherein the dispersant modifies slurry rheology of the cement composition.

15. The composition of claim 1, wherein the defoamer comprises glycol, polyglycol, or silicon, or any combination thereof.

16. The composition of claim 1, comprising a dispersant that facilitates mixing and placement of the cement composition as the cement slurry.

17. The composition of claim 1, comprising a dispersant that reduces flocculation of particles of the cement in the composition.

18. The composition of claim 1, comprising polyunsulfonated naphthalene (PNS), hydroxycarboxylic acid, polycarboxylic acid, or polycarboxylate ether, or any combinations thereof.

19. The composition of claim 1, wherein the polyrotaxane is not covalently bonded to the polymer, and wherein the polymer comprises a weight-average molecular weight of at least 10,000 grams per mole.

20. The composition of claim 1, wherein the polymer bonded to the polyrotaxane comprises the polymer cross-linked to the polyrotaxane.

21. The composition of claim 1, wherein the polymer bonded to the polyrotaxane comprises the polymer bonded to a ring of the polyrotaxane.

22. The composition of claim 1, wherein the ring is chemically modified to facilitate bonding of the polymer to the polyrotaxane.

23. The composition of claim 1, wherein the polymer bonded to the polyrotaxane comprises the polymer bonded to the polyrotaxane via a functional group of a ring of the polyrotaxane.

24. The composition of claim 1, wherein the polymer bonded to the polyrotaxane comprises the polymer bonded to a functionalized ring of the polyrotaxane.

25. The composition of claim 24, wherein functionalized comprises hydroxylpropylation.

26. A cement composition comprising:
cement at an amount greater than any other constituent in the cement composition, wherein the cement comprises Portland cement;
water at an amount greater than any other constituent in the cement composition, except for the cement; and
a sliding-ring polymer comprising a polyrotaxane and a polymer, wherein the polymer is bonded to the polyrotaxane.

27. A cement composition comprising:
cement at an amount greater than any other constituent in the cement composition, wherein the cement comprises Portland cement;
water;
a sliding-ring polymer comprising a polyrotaxane and a polymer, wherein the polymer is bonded to the polyrotaxane; and
a defoamer that restricts foam formation in the cement composition, wherein the cement composition is a cement slurry.

* * * * *

UNITED STATES PATENT AND TRADEMARK OFFICE
CERTIFICATE OF CORRECTION

PATENT NO. : 11,230,497 B2
APPLICATION NO. : 16/843070
DATED : January 25, 2022
INVENTOR(S) : Patel et al.

It is certified that error appears in the above-identified patent and that said Letters Patent is hereby corrected as shown below:

In the Claims

Column 18, Line 30, Claim 22, delete "claim 1" and insert -- claim 21 --;

Column 18, Line 41, Claim 25, delete "hydroxylpropylation" and insert -- hydroxypropylation --.

Signed and Sealed this
Seventh Day of June, 2022

*Katherine Kelly Vidal*

Katherine Kelly Vidal
*Director of the United States Patent and Trademark Office*